United States Patent
Kim (10) Patent No.: US 11,858,568 B2
(45) Date of Patent: Jan. 2, 2024

(54) APPARATUS AND METHOD FOR CONTROLLING REAR WHEEL STEERING

(71) Applicants: Hyundai Motor Company, Seoul (KR); Kia Motors Corporation, Seoul (KR)

(72) Inventor: Seung-Ki Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 141 days.

(21) Appl. No.: 16/846,662

(22) Filed: Apr. 13, 2020

(65) Prior Publication Data

US 2021/0188348 A1 Jun. 24, 2021

(30) Foreign Application Priority Data

Dec. 20, 2019 (KR) .................. 10-2019-0171471

(51) Int. Cl.
*B62D 6/00* (2006.01)
*B62D 15/02* (2006.01)
(52) U.S. Cl.
CPC ........... *B62D 6/002* (2013.01); *B62D 15/021* (2013.01)
(58) Field of Classification Search
CPC ...... B62D 6/002; B62D 15/021; B62D 6/001; B62D 1/286
See application file for complete search history.

(56) References Cited

U.S. PATENT DOCUMENTS

| 4,621,833 A * | 11/1986 | Soltis ................... B60G 17/016 280/5.506 |
| 2010/0152952 A1 * | 6/2010 | Lee ........................ B62D 1/286 701/31.4 |

FOREIGN PATENT DOCUMENTS

| KR | 10-2016-0125666 A | 11/2016 |
| KR | 102263187 B1 * | 6/2021 |

OTHER PUBLICATIONS

Machine Translation of KR-102263187-B1 (Year: 2017).*

* cited by examiner

*Primary Examiner* — Faris S Almatrahi
*Assistant Examiner* — Andrew J Cromer
(74) *Attorney, Agent, or Firm* — Fox Rothschild LLP (57) ABSTRACT

An apparatus for controlling rear wheel steering is provided. The apparatus includes a turning state estimator that acquires steering angle information from a steering angle sensor and estimates a turning state by calculating a required steering speed from the steering angle information. A normal state lateral acceleration predictor predicts a normal state lateral acceleration to match the required steering speed in response to determining that the required steering speed is equal to or greater than a speed threshold value. A rear wheel steering angle calculator calculates a rear wheel steering angle based on the steering angle and the lateral acceleration.

2 Claims, 7 Drawing Sheets

APPARATUS AND METHOD FOR CONTROLLING REAR WHEEL STEERING

CROSS-REFERENCE TO RELATED APPLICATIONS

This application claims priority to Korean Patent Application No. 10-2019-0171471, filed on Dec. 20, 2019, which is incorporated herein by reference in its entirety.

BACKGROUND

Field of the Disclosure

The present disclosure relates to an apparatus and a method for controlling steering of a vehicle capable of performing rear wheel drive.

Description of the Related Art

Figure 1:
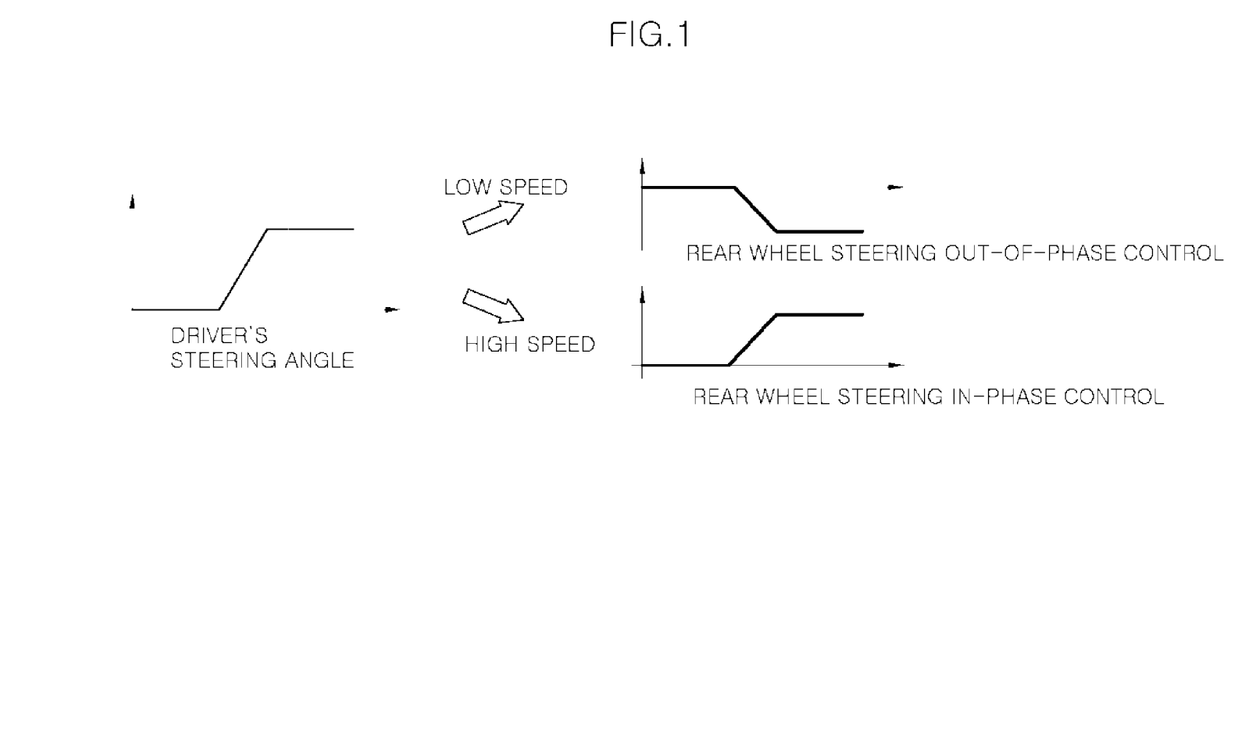
FIG. 1 is a diagram illustrating a general rear wheel steering system according to the related art.

A four-wheel drive vehicle may transfer power simultaneously to four wheels, and thus shows superior performance in stability and drive balance in comparison with a two-wheel drive vehicle. The four-wheel drive controls or adjusts steering of rear wheels based on a steering angle and a steering velocity during driver's steering. As shown in FIG. 1 of the related art, at low speed, a turning radius of the vehicle is reduced by performing rear wheel steering (e.g., out-of-phase control) in a direction opposite to the driver's steering direction, and at high speed, rear wheel steering (e.g., in-phase control) is performed in a direction that is equal to the driver's steering direction to improve stability during high-speed turning.

However, according to the four-wheel drive system in the related art as described above, the rear wheel steering continuously occurs during the driver's steering, and this may cause steering heterogeneity to occur in comparison with the two-wheel drive. During the driver's steering, the vehicle moves in the order of steering angle occurrence, yaw rate occurrence, and roll angle occurrence. In particular, as a delay increases between the steering angle and the yaw rate or between the yaw rate and the roll angle, the driver feels that the handling reaction of the vehicle becomes slower. During the high-speed in-phase control, a low yaw rate occurs, and thus it is difficult for the driver to experience a rapid steering feel.

The foregoing description of the background technology is intended merely to help the understanding of the background of the present disclosure, and is not intended to mean that the present disclosure falls within the purview of the related art that is already known to those of ordinary skill in the art.

SUMMARY

The present disclosure provides an apparatus and a method for controlling rear wheel steering, which provides a driver with a sense of unity during turning by reducing the yaw rate-roll delay time through a control or adjustment of rear wheel steering during driver's steering.

Other objects and advantages of the present disclosure may be understood by the following description, and become apparent with reference to the exemplary embodiments of the present disclosure. Additionally, it is obvious to those skilled in the art to which the present disclosure pertains that the objects and advantages of the present disclosure may be realized by the means as claimed and combinations thereof.

In one aspect of the present disclosure, an apparatus for controlling rear wheel steering may include a turning state estimator configured to acquire steering angle information from a steering angle sensor and to estimate a turning state by calculating a required steering speed from the steering angle information; a normal state lateral acceleration predictor configured to predict a normal state lateral acceleration to match the required steering speed in response to determining that the required steering speed is equal to or greater than a speed threshold value; and a rear wheel steering angle calculator configured to calculate a rear wheel steering angle in accordance with the steering angle and the lateral acceleration.

Particularly, the normal state lateral acceleration predictor predicts the lateral acceleration through reflection of the steering angle and wheel speed information. Further, the apparatus may further include a steering intention determinator configured to acquire steering torque information from a steering torque sensor and to determine a driver's turning intention by the steering torque information. The turning state estimator may be configured to estimate the turning state in response to determining that the steering torque is equal to or greater than a torque threshold value.

In another aspect of the present disclosure, a method for controlling rear wheel steering may include calculating a steering speed; comparing the steering speed with a speed threshold value; calculating a lateral acceleration to match the steering speed in response to determining that the steering speed is equal to or greater than the speed threshold value; and calculating a rear wheel steering angle based on the lateral acceleration.

The method may further include reducing a rear wheel steering angle control amount in response to determining the steering speed is less than the speed threshold value. Further, the calculating the lateral acceleration may include calculating the lateral acceleration by reflecting steering angle information acquired from a steering angle sensor and wheel speed information acquired from a wheel speed sensor. Additionally, the method may include comparing a steering torque with a torque threshold value before calculating the steering speed. In response to determining that the steering torque is equal to or greater than the torque threshold value, the steering speed may be calculated, whereas in response to determining that the steering torque is less than the torque threshold value, a control may end.

According to the apparatus and the method for controlling the rear wheel steering according to the present disclosure, since the lateral force is rapidly generated at the rear wheel in the initial stage of steering, the delay time of the occurrence of the yaw rate and the roll angle may be reduced, and thus the sense of unity during the turning may be provided to the driver. Further, the lateral slip size and the variation width of the front and rear wheels may be reduced at the initial stage of steering, and thus the stable turning becomes possible to improve the vehicle stability. In addition, it may be possible to minimize the heterogeneity felt by the driver due to the rear wheel steering through reduction of the rear wheel steering control amount in the normal state of the turning.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The above-described objects, features, and advantages of the present disclosure will be described in detail with reference to the accompanying drawings, and accordingly, those of ordinary skill in the art to which the present disclosure pertains will be able to fully understand and easily embody the technical concept of the present disclosure.

In describing the exemplary embodiments of the present disclosure, detailed description of well-known technologies related to the present disclosure will be reduced or omitted in the case where it is determined that it obscures the subject matter of the present disclosure in unnecessary detail.

Figure 2:
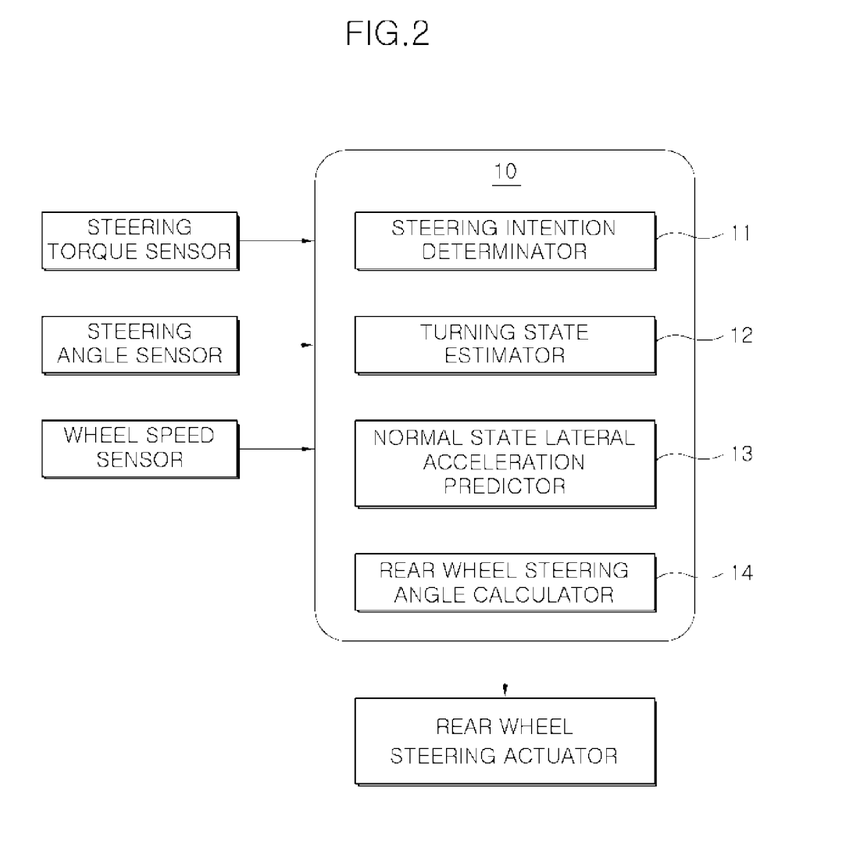
FIG. 2 is a block diagram illustrating the configuration of an apparatus for controlling rear wheel steering according to an exemplary embodiment of the present disclosure.
Figure 3:
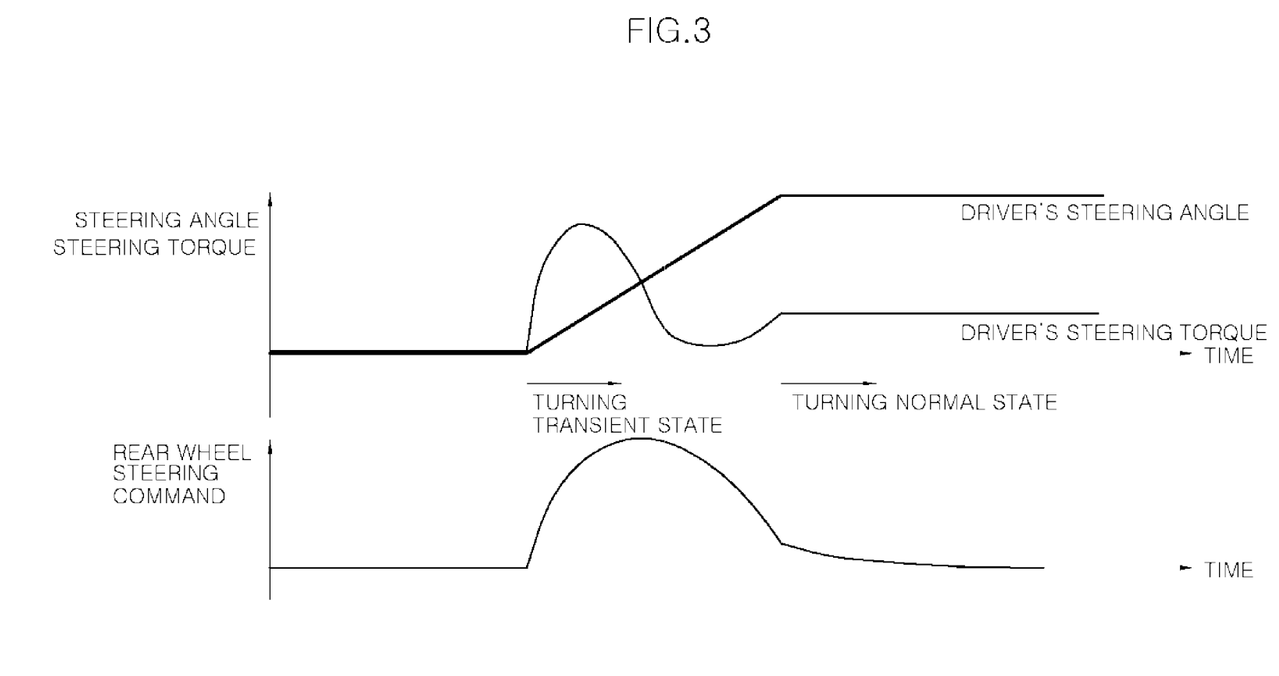
FIG. 3 is a diagram illustrating a rear wheel steering control state in accordance with time according to an exemplary embodiment of the present disclosure.

FIG. 2 is a block diagram illustrating the configuration of an apparatus for controlling rear wheel steering according to the present disclosure, and FIG. 3 is a diagram illustrating a rear wheel steering control state in accordance with time according to the present disclosure. Hereinafter, with reference to FIGS. 2 and 3, an apparatus for controlling rear wheel steering according to an exemplary embodiment of the present disclosure will be described.

An apparatus for controlling rear wheel steering according to the present disclosure minimizes a yaw rate-roll delay time during vehicle turning by driver's steering to provide a sense of unity during the turning to the driver. Further, to rapidly generate a roll, a lateral force of a rear wheel tire should be generated rapidly. For this, according to the present disclosure, rear wheel steering may be adjusted to predict a lateral acceleration desired by a driver in advance in an initial state (transient state) of driver's steering, and the lateral acceleration desired by the driver in the transient state may be generated rapidly.

Thereafter, when the vehicle enters into a normal state, a control amount may be reduced to minimize heterogeneity of the rear wheel steering control. The apparatus 10 for controlling rear wheel steering according to the present disclosure may include a steering intention determinator 11, a turning state estimator 12, a normal state lateral acceleration predictor 13, and a rear wheel steering angle calculator 14. Each of the components may be operated by a controller. The apparatus 10 for controlling rear wheel steering may be implemented as a partial configuration and function of an electronic control unit (ECU), or it may be separately configured.

The apparatus 10 for controlling the rear wheel steering may be configured to control or adjust a rear wheel steering actuator by successively calculating a lateral acceleration and a rear wheel steering angle using sensor measurement values of a steering torque sensor, a steering angle sensor, and a wheel speed sensor. First, the steering intention determinator 11 may be configured to determine a turning intention of a driver based on steering torque information acquired from the steering torque sensor. Accordingly, the steering intention determinator 11 prevents intervention in a rear wheel steering control if steering occurs due to disturbance, such as a bump or porthole, having no turning intention.

The turning state estimator 12 may be configured to calculate the steering speed intended by a driver by differentiating steering angle information acquired from the steering angle sensor to determine whether the current state is a turning transient state or a turning normal state during driver's steering. Further, the normal state lateral acceleration predictor 13 may be configured to predict a normal state lateral acceleration desired by the driver based on the steering angle and wheel speed information acquired from the steering angle sensor and the wheel speed sensor.

The rear wheel steering angle calculator 14 may then be configured to calculate the rear wheel steering angle for rapidly generating a rear wheel tire lateral force based on the driver's steering angle in the turning transient state and lateral acceleration information desired by the driver. Thereafter, when the vehicle enters into the turning normal state, the rear wheel steering control amount may be reduced to reduce heterogeneity caused by the rear wheel steering control.

On the other hand, the lateral acceleration size prediction and the rear wheel steering angle size determination will be described in more detail through discrimination of the turning transient state and the turning normal state from each other with reference to FIG. 3. First, in the turning transient state, the steering intention determinator 11 may be configured to detect the change of the driver's steering torque and operate the apparatus for controlling the rear wheel steering.

Further, the turning state estimator 12 may be configured to detect that the steering speed is rapid through steering angle differentiation, and determine the entry into the turning transient state. Then, the normal state lateral acceleration predictor 13 may be configured to predict the size of the lateral acceleration desired by the driver, and the size of the lateral acceleration may be predicted by the following expression.

$$A_x = \frac{v_x^2}{L(1 + v_x * \kappa)} * \lambda * \sigma_{sw} \qquad \text{Mathematical expression 1}$$

$A_x$: predicted lateral acceleration $v_x$: vehicle speed (wheel speed)

$L$: wheel base $\kappa$: vehicle characteristic coefficient $\delta_{sw}$: steering angle $\lambda$: steerino ratio As described above, the lateral acceleration may be predicted, and finally, the rear wheel steering angle calculator 14 may be configured to calculate the rear wheel steering angle for generating a lateral force of a rear wheel tire to rapidly generate the lateral acceleration. Further, in the turning normal state, the steering intention determinator 11 may be configured to detect the driver's steering angle and the remaining steering torque, and continuously operate the apparatus for controlling the rear wheel steering to cope with the driver's additional steering.

The turning state estimator 12 may be configured to recognize that the steering speed is very low (e.g., less than a predetermined threshold), and determine the entry into the turning normal state. Accordingly, the normal state lateral acceleration predictor 13 does not predict the lateral acceleration size desired by the driver in the turning normal state. Further, the rear wheel steering angle calculator 14 may be configured to reduce the rear wheel steering control amount remaining to reduce the driver's heterogeneity caused by the rear wheel steering control in the turning normal state.

Meanwhile, the rear wheel steering angle calculation in the turning transient state and in the turning normal state may be performed as follows. First, in the turning transient state, the rear wheel steering angle calculator 14 may be configured to adjust the rear wheel steering angle in the same direction as the driver's steering angle so that the lateral force to be generated in the turning normal state is brought up in advance at an initial stage of the steering, and the rear wheel steering angle size may be determined by the following expression.

$$\begin{cases} \text{if sign } (\sigma_{sw}^* \cdot \sigma_{sw}) > 0 & \text{Mathematical expression 2} \\ \sigma_{rws} = \text{sign}(A_y) \cdot |A_y| \cdot \frac{C_{rws}}{\tau s + 1} \sigma_{rws} = 0 \\ \text{else} \end{cases}$$

Further, if the rear wheel control amount remains in the turning normal state, the steering heterogeneity may be provided to the driver, and thus the remaining rear wheel steering control amount may be gradually reduced. In particular, the rear wheel steering angle size may be determined by the following expression.

$$\delta = -k \cdot \delta_{rws} \qquad \text{Mathematical expression 3}$$

In mathematical expressions 2 and 3, coefficients are defined as follows.

$C_{rws}$: rear wheel steering gain r: rear wheel steering time coefficient

κ: control amount reduction coefficient

As described above, the apparatus for controlling rear wheel steering according to the present disclosure performs the control operation through the above-described configuration. Hereinafter, based on this, a method for controlling rear wheel steering according to the present disclosure will be described with reference to FIG. 4. The method described herein below may be executed by a controller.

Figure 4:
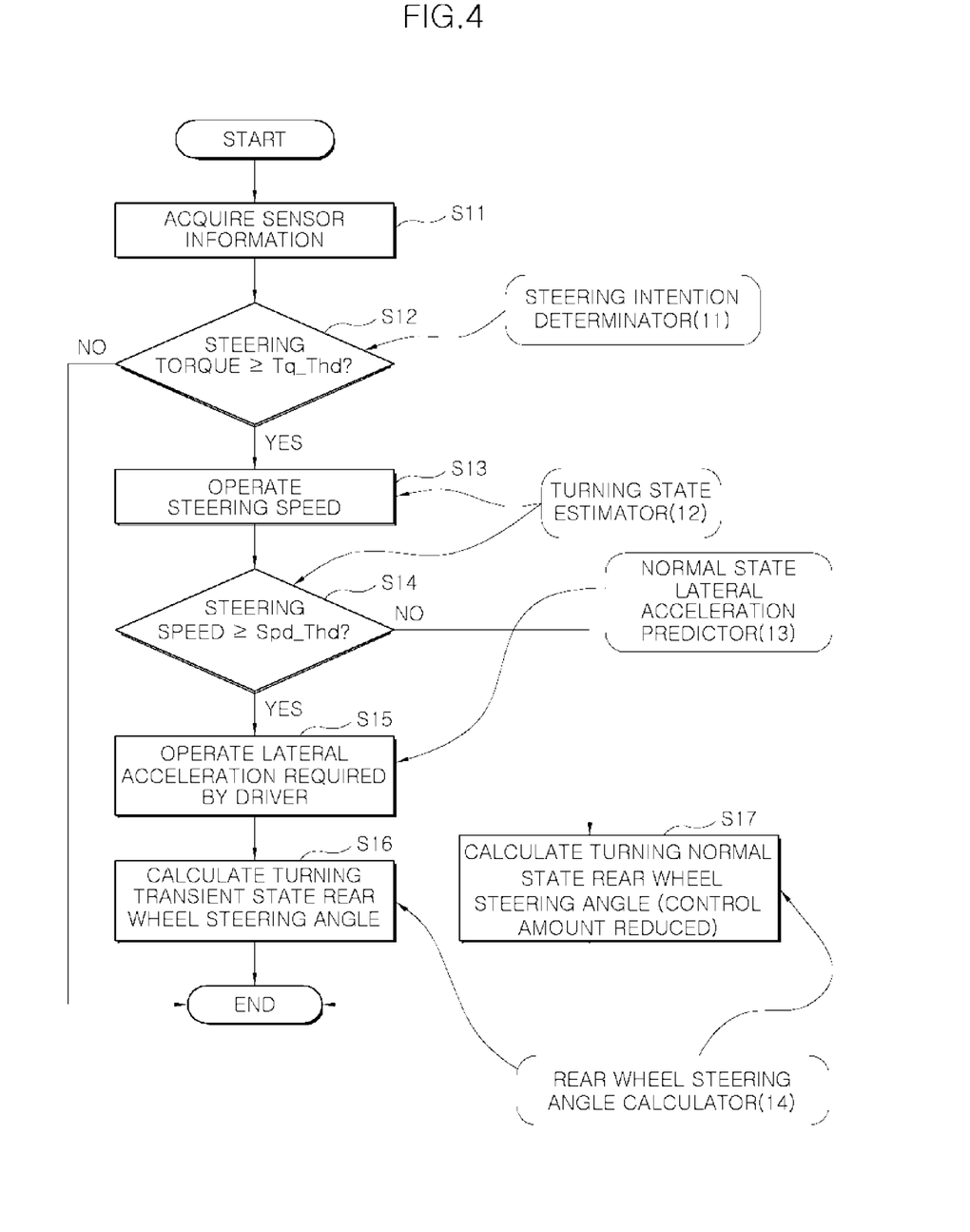
FIG. 4 is a diagram illustrating in order a method for controlling rear wheel steering according to an exemplary embodiment of the present disclosure.

The apparatus 10 for controlling the rear wheel steering may be configured to receiving information from sensors, such as a steering torque sensor, a steering angle sensor, and a wheel speed sensor (S11), and the steering intention determinator 11 may be configured to compare the steering torque with a torque threshold value Tq_Thd (S12). In response to determining that the steering torque is equal to or greater than the torque threshold value as the result of the comparison, a driver turning intention may be detected and the rear wheel steering control may begin. However, in response to determining that the steering torque is less than the torque threshold value, the rear wheel steering control may end.

Through the rear wheel steering control start, the turning state estimator 12 may be configured to calculate the steering speed (S13). Further, the turning state estimator 12 may be configured to compare the steering speed with a speed threshold value Spd_Thd (S14). In response to determining that the steering speed is equal to or greater than the speed threshold value as the result of comparing the steering speed with the speed threshold value, the turning state estimator 12 may be configured to determine that the current state is the turning transient state. In response to determining that the steering speed is less than the speed threshold value, the turning state estimator 12 may be configured to determine that the current state is the turning normal state.

When the turning transient state is determined as the result, the normal state lateral acceleration predictor 13 may be configured to calculate the lateral acceleration desired by the driver using the steering angle and the wheel speed (S15). Further, based on the lateral acceleration calculated at S15, the rear wheel steering angle calculator 14 may be configured to calculate the rear wheel steering angle (S16), and operate the rear wheel actuator in accordance with the calculated value.

Figure 5:
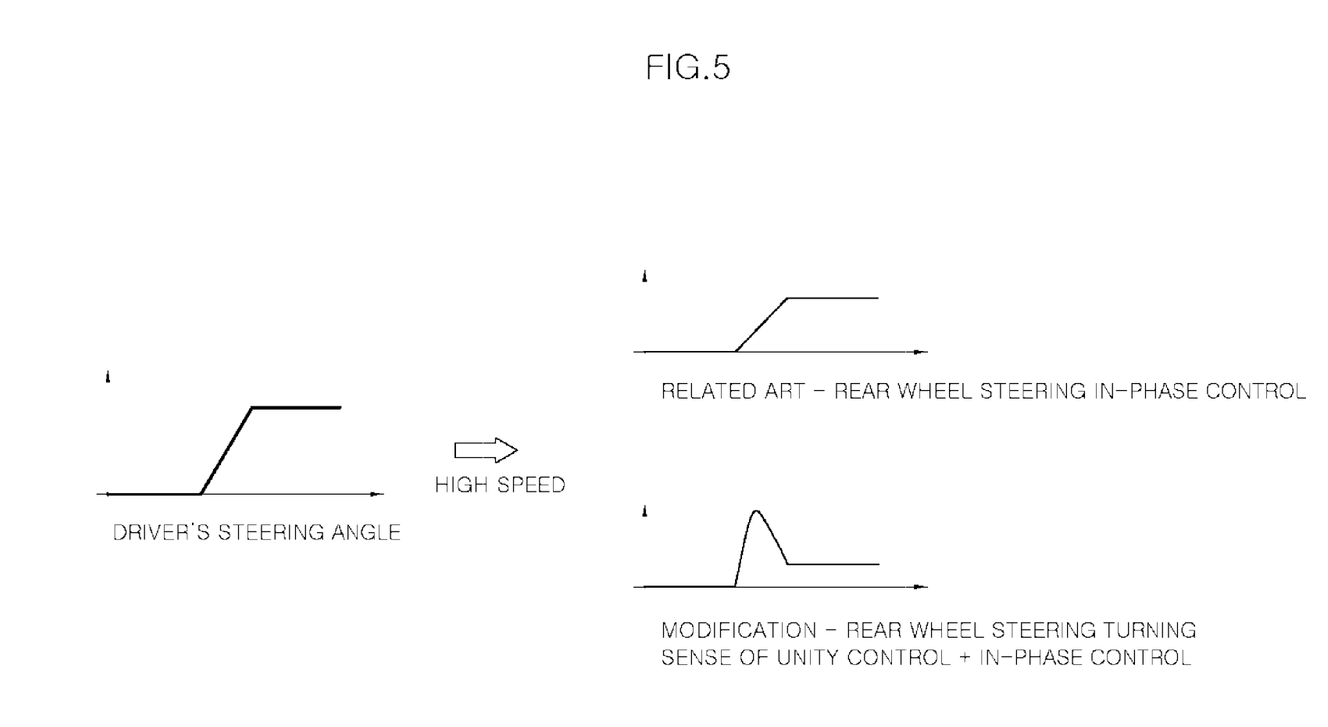
FIG. 5 is a diagram illustrating an example of a rear wheel steering system according to an exemplary embodiment of the present disclosure.

In contrast, when the turning normal state is determined as the result of the determination at S14, the rear wheel steering angle calculator 14 may be configured to calculate the corresponding rear wheel steering angle, and reduce the remaining rear wheel steering control amount (S17). Further, it may be possible to combine the above-described control method according to the present disclosure with the existing control method. In other words, with reference to FIG. 5, by combining the out-of-phase control at low speed with the in-phase control at high speed, as described above with reference to the drawings, the in-phase control may be performed after the rapid control in the turning transient state based on the driver's steering angle.

Figure 6:
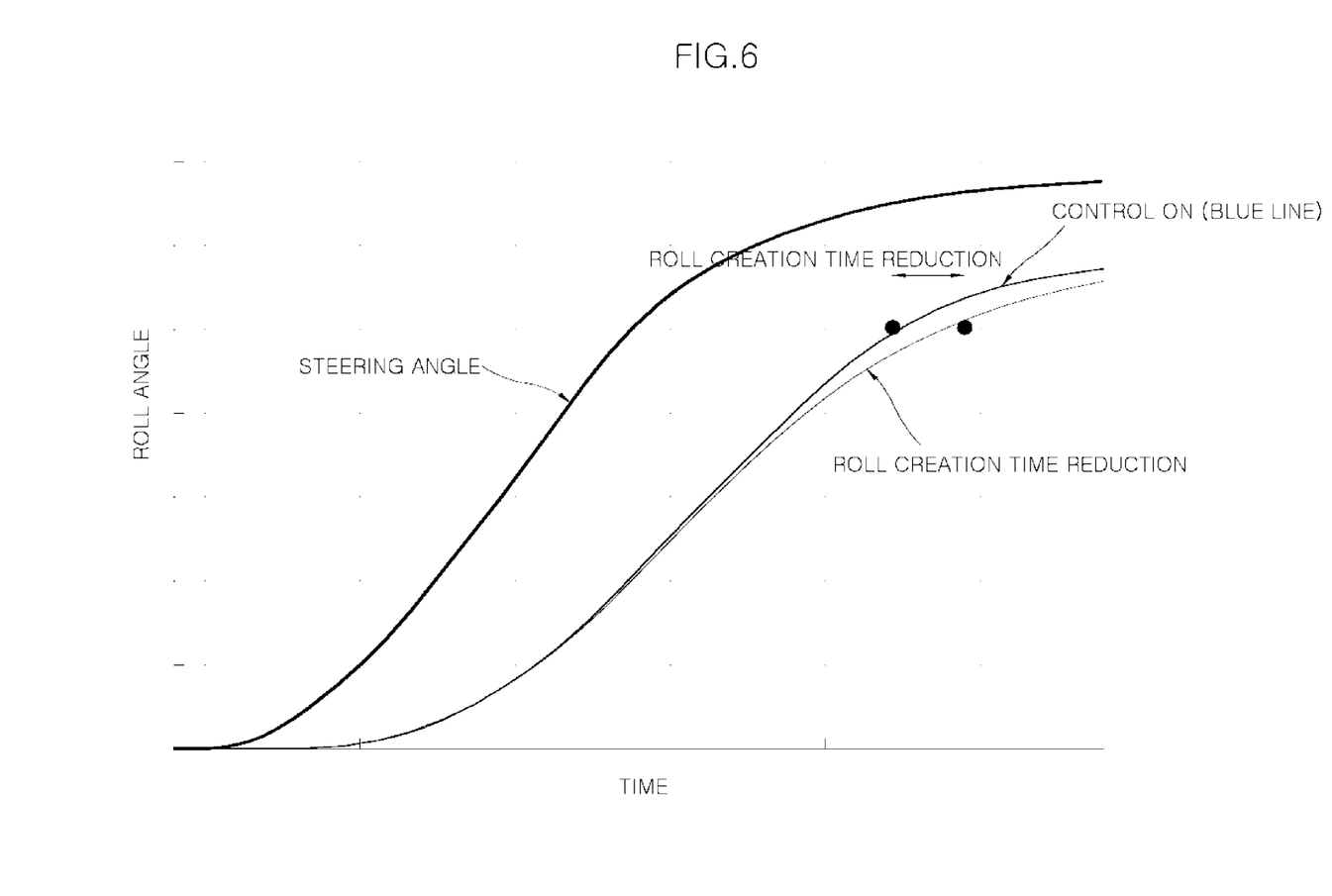
FIG. 6 is a diagram illustrating a change of a roll angle according to an exemplary embodiment of the present disclosure.
Figure 7:
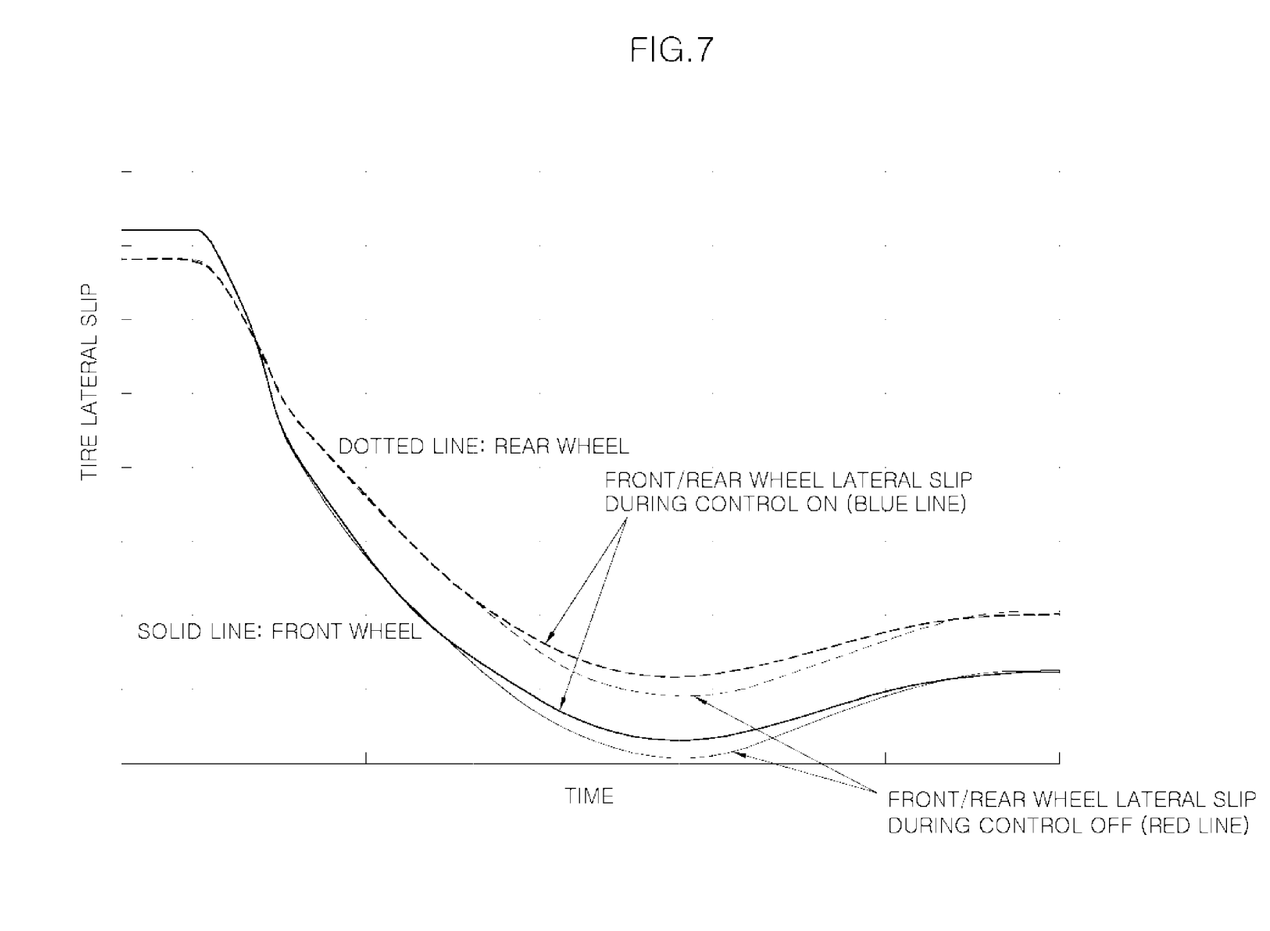
FIG. 7 is a diagram illustrating a change of a tire lateral slip according to an exemplary embodiment of the present disclosure.

As described above, according to the apparatus and the method for controlling the rear wheel steering according to the present disclosure, as the lateral force is generated rapidly at the rear wheel at an initial stage of steering, the delay time of the yaw rate and roll occurrence may be reduced as shown in FIG. 6, and thus the sense of unity during turning may be provided to the driver. Further, as shown in FIG. 7, at an initial stage of steering, the lateral slip size and the variation width of the front and rear wheels may be reduced, and thus more stable turning becomes possible to improve the vehicle stability. Additionally, by reducing the rear wheel steering control amount in the turning normal state, heterogeneity that the driver feels due to the rear wheel steering may be minimized.

While the present disclosure has been described with reference to the exemplified drawings, it will be apparent to those of ordinary skill in the art that the present disclosure is not limited to the described exemplary embodiments, and various changes and modifications may be made without departing from the spirit and scope of the present disclosure. Accordingly, such changes and modifications should belong to the claims of the present disclosure, and the right of the present disclosure should be construed based on the appended claims.

What is claimed is:

1. An apparatus for controlling rear wheel steering, comprising:
 a steering intention determinator operated by a controller including a processor and configured to acquire steering torque information from a steering torque sensor and to determine a turning intention of a driver using the steering torque information;
 a turning state estimator operated by the controller and configured to acquire steering angle information from a steering angle sensor, to determine that a current state is a turning transient state when the steering torque is equal to or greater than a torque threshold value, and to estimate a turning state by calculating a required steering speed from the steering angle information;
 a normal state lateral acceleration predictor operated by the controller and configured to, when the current state is the turning transient state, predict a normal state lateral acceleration to match the required steering speed in response to determining that the required steering speed is equal to or greater than a speed threshold value, wherein the normal state lateral acceleration predicted by reflecting steering angle information acquired from the steering angle sensor and wheel speed information acquired from a wheel speed sensor; and
 a rear wheel steering angle calculator operated by the controller and configured to calculate a rear wheel steering angle based on the steering angle and the normal state lateral acceleration,
 wherein the turning state estimator is configured to estimate the turning state in response to determining that the steering torque is equal to or greater than the torque threshold value, and
 wherein the controller is further configured to control a rear wheel steering actuator based on the rear wheel steering angle and the normal state lateral acceleration.

2. A method for controlling rear wheel steering, comprising:
 comparing, by a controller, a steering torque with a torque threshold value;
 calculating, by the controller, a steering speed;
 comparing, by the controller, the steering speed with a speed threshold value when the steering torque is equal to or greater than the torque threshold value;
 calculating, by the controller, a lateral acceleration to match the steering speed when the steering torque is equal to or greater than the torque threshold vale and in response to determining that the steering speed is equal to or greater than the speed threshold value, wherein the lateral acceleration is calculated by reflecting steering angle information acquired from a steering angle sensor and wheel speed information acquired from a wheel speed sensor;
 calculating, by the controller, a rear wheel steering angle based on the lateral acceleration;
 terminating, by the controller, the method when the steering torque is less than the torque threshold value;
 reducing, by the controller, a rear wheel steering angle control amount in response to determining that the steering speed is less than the speed threshold value; and
 controlling, by the controller, a rear wheel steering actuator based on the rear wheel steering angle and the lateral acceleration.

* * * * *